United States Patent [19]

Colvin et al.

[11] 4,276,100
[45] Jun. 30, 1981

[54] PROCESS FOR DISPOSING OF DECOY FLARE MATERIAL

[75] Inventors: Robert E. Colvin, Loogootee; Bernard E. Douda; Francis E. Montgomery, both of Bloomfield; James E. Short, Jr., Switz City, all of Ind.

[73] Assignee: The United States of America as represented by the Secretary of the Navy, Washington, D.C.

[21] Appl. No.: 658,650

[22] Filed: Feb. 13, 1976

[51] Int. Cl.³ .................................................. C06B 45/10
[52] U.S. Cl. .................................. 149/109.6; 149/19.3; 149/19.92; 264/3 R
[58] Field of Search .................. 149/19.3, 19.1, 19.92, 149/109.6; 264/3 R

[56] References Cited

U.S. PATENT DOCUMENTS

| 3,652,350 | 3/1972 | Timmermans | 149/19.92 X |
| 3,732,132 | 5/1973 | Merrow et al. | 149/19.3 |
| 3,770,525 | 11/1973 | Villey-Desmcserets et al. | 149/19.3 |
| 3,778,320 | 12/1973 | Yosim et al. | 149/105 X |
| 3,876,477 | 4/1975 | Elridge et al. | 149/19.3 |
| 3,897,237 | 7/1975 | Musselman et al. | 71/1 |

Primary Examiner—Edward A. Miller

[57] ABSTRACT

A process for the disposal of decoy flares comprised essentially of magnesium powder, fluorocarbon rubber and polytetrafluoroethylene. The flare is separated into chunks which are then soaked in acetone or ethyl acetate which dissolves the fluorocarbon rubber. The solvent and fluorocarbon rubber are decanted off and hexane is added to solidify the fluorocarbon rubber. The remaining ingredients are washed and then dried and screened to separate the magnesium powder.

6 Claims, 1 Drawing Figure

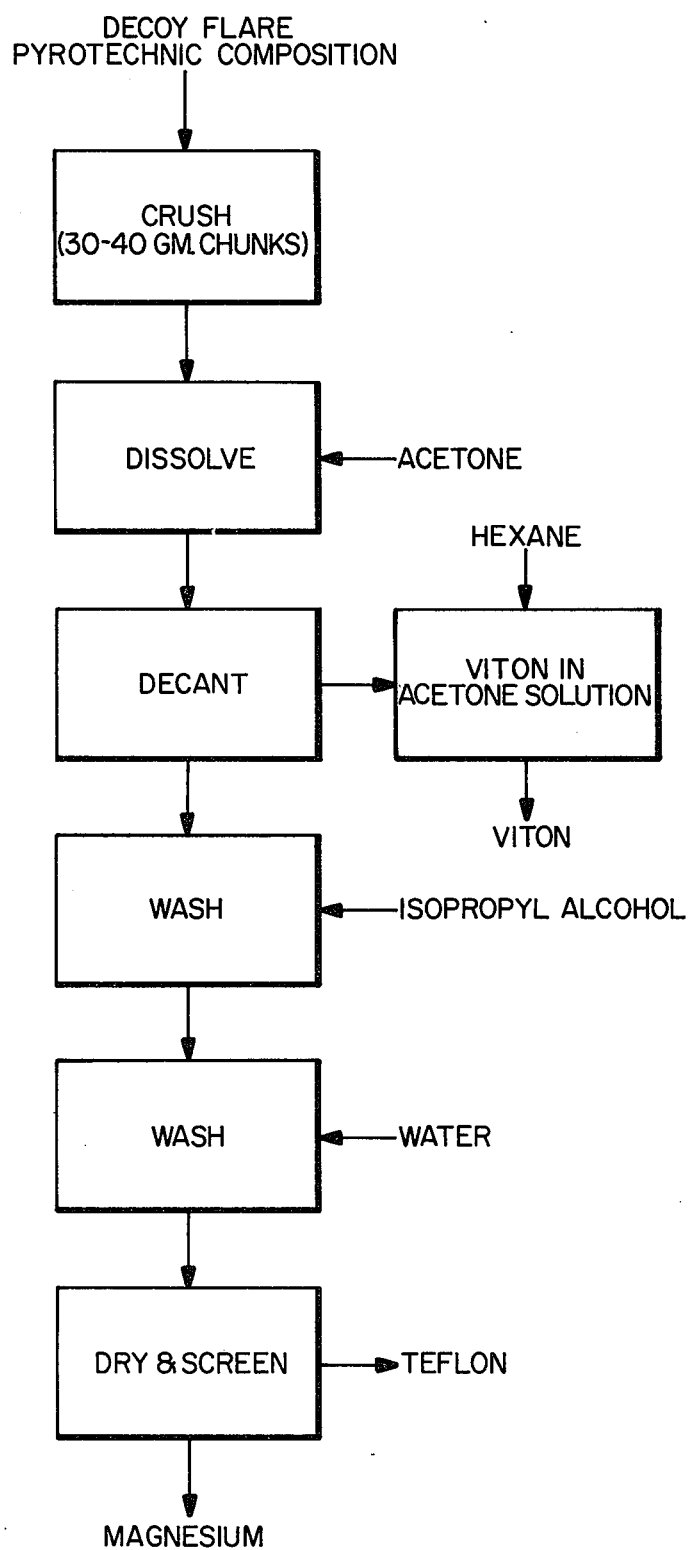

PROCESS FOR DISPOSING OF DECOY FLARE MATERIAL

BACKGROUND OF THE INVENTION

The invention relates to a process for disposing of decoy flares and more particularly to a non-polluting method of disposing of decoy flares comprised of magnesium powder, Teflon and Viton A, and also a method of disposing of waste materials which comes from the manufacture of such flares.

It is necessary to dispose of old decoy flares and waste generated from their manufacture as storage of such material is both costly and hazardous. Waste decoy flare composition may be either bulk composition, left over from a production run or might be from defective decoy flares. The magnitude of the problem can be seen from the disposal schedule for one Naval Ammunition Depot. There were on hand, 43,500 decoy flares scheduled for disposal which amounted to 19,000 pounds of pyrotechnic composition. In addition, about 80 pounds of scrap composition was being generated each day.

Heretofore, the main disposal method for decoy flare material was to burn the material in an open burning-pit in a sparsely populated area. This burning method was particularly undesirable as it not only polluted the air with smoke but additionally the products of combustion from the incineration of the fluorocarbons (Teflon and Viton) creates a hazardous condition. Additionally, the scrap material had a salvage value of about $5.00 a pound and thus the ingredients were well worth reclaiming.

SUMMARY OF THE INVENTION

The present invention relates to a process for disposing of decoy flare material comprised of magnesium powder, Teflon and Viton A. The material is first crushed into chunks weighing between 30 and 40 grams and these chunks are soaked in either acetone or ethyl acetate which dissolves the Viton A. The solvent and Viton in solution are decanted and hexane is added to recover the Viton. The remaining ingredients are then washed and dried and the magnesium powder and Teflon are separated.

It is therefore a general object of the present invention to provide a method for disposing of a flare composition which is safe and non-polluting of the environment.

Other objects, advantages and novel features of the present invention will become apparent from the following detailed description of the invention when considered in conjunction with the accompanying drawing.

BRIEF DESCRIPTION OF THE DRAWING

The FIGURE of the drawing is a block diagram showing the steps of a preferred method of the present invention.

DESCRIPTION OF THE PREFERRED EMBODIMENT

In the disposal method of the present invention, the three ingredients of the decoy flare are separated and then can be disposed of in an ecologically permissible manner. Preferably, however, the ingredients can be again used in making pyrotechnic devices for military usage. By way of example, a typical decoy flare is comprised, by weight, of about 54 percent of magnesium powder, about 30 percent of Teflon, and about 16 percent of Viton A. Viton A, which is a fluorocarbon rubber is produced by E. I. DuPont de Nemours Company and has the formula $(C_3H_2F_4)_x$, and is comprised of about 32.1 percent of carbon, about 1.8 percent of hydrogen and about 66.1 percent of florine. Viton A is used as a binder and a source of florine. Teflon, which has the chemical name of polytetrafluoroethylene, is used in a fibrous form for a source of florine.

Prior to separation of the three basic ingredients of the decoy flare composition, the pyrotechnic composition is first crushed by suitable means to form chunks of material weighing between 30 and 40 grams. The chunks are placed in a container which is then filled with a solvent to cover the material in the container. Preferably, the solvent, which is either acetone or ethyl acetate, is agitated by a magnetic type stirrer for a period between $1\frac{1}{2}$ and 2 hours. The solvent dissolves the Viton A (fluorocarbon rubber) and the solvent and dissolved Viton A are decanted. Hexane is then added to the decanted solution which precipitates the Viton A which can then be collected by a filtering process.

The remaining ingredients are then washed for about 10 minutes with isopropyl alcohol and, after the liquid is removed, another 10 minutes wash with water is provided. The liquid from the water washed is then removed and the remaining ingredients are dried and screened. The Teflon fibers are recovered off the top of the screen while the magnesium powder is removed under the screen.

The following examples are illustrative of the invention:

EXAMPLE I 400 grams of decoy flare material having the formula, by weight, of 54 percent magnesium powder, 30 percent Teflon and 16 percent Viton A was crushed into chunks weighing between 30 and 40 grams. The material was placed in a breaker which was then filled with acetone so as to cover the material. The acetone and chunks of material were agitated for 90 minutes by a magnetic stirrer. The Viton A was dissolved and the acetone and Viton A in solution was decanted. Hexane was then added to the decanted solution to precipitate the Viton A which was then removed by filtering. The remaining ingredients were washed with isopropyl alcohol for ten minutes followed by a wash with distilled water for ten minutes. The ingredients were then dried and screened. The Teflon fibers were recovered off the top of the screen and the magnesium powder is removed under the screen. The magnesium which was recovered had a purity of 98.23 percent.

EXAMPLE II 400 grams of decoy flare material having the formula as in EXAMPLE I was processed as in EXAMPLE I except that the crushed material was soaked in ethyl acetate. The ethyl acetate and chunks of material were agitated for 110 minutes by a magnetic stirrer. The screen magnesium which was recovered had a purity of 96.98 percent.

It can thus be seen that the present invention provides a disposal method for a decoy flare pyrotechnic composition which does not pollute the environment. Further, that the ingredients of a decoy flare are recycled to provide useful end products.

Obviously many modifications and variations of the present invention are possible in the light of the above teachings. It is therefore to be understood that within the scope of the appended claims the invention may be practiced otherwise than as specifically described.

We claim:

1. A process for reclaiming materials from decoy flares comprised of magnesium powder, fluorocarbon rubber and polytetrafluoroethylene, said process comprising, first crushing decoy flares into chunks, then dissolving said chunks in a solvent selected from the group consisting of acetone and ethyl acetate, then decanting to remove the solvent and the fluorocarbon rubber in solution, then washing the remaining ingredients, and finally drying and screening the remaining ingredients to separate the magnesium and polytetrafluororethylene.

2. A process for reclaiming materials from decoy flares as set forth in claim 1 wherein said remaining ingredients are first washed with isopropyl alcohol followed by a second wash with water.

3. A process for reclaiming materials from decoy flares as set forth in claim 1 wherein said solvent is acetone and hexane is added to the solution of acetone and fluorocarbon rubber to remove said fluorocarbon rubber from solution.

4. A process for reclaiming materials from decoy flares as set forth in claim 3 wherein said acetone is agitated between 90 and 120 minutes to facilitate dissolving the chunks of decoy flare material.

5. The process for reclaiming materials from decoy flares as set forth in claim 1 wherein said solvent is ethyl acetate and hexane is added to the solution of ethyl acetate and fluorocarbon rubber to remove said fluorocarbon rubber from solution.

6. A process for reclaiming materials from decoy flares as set forth in claim 5 wherein said ethyl acetate is agitated between 90 and 120 minutes to facilitate dissolving the chunks of decoy flare material.

* * * * *